May 21, 1963    E. N. DACUS    3,090,239
ACCELEROMETER
Filed May 12, 1955
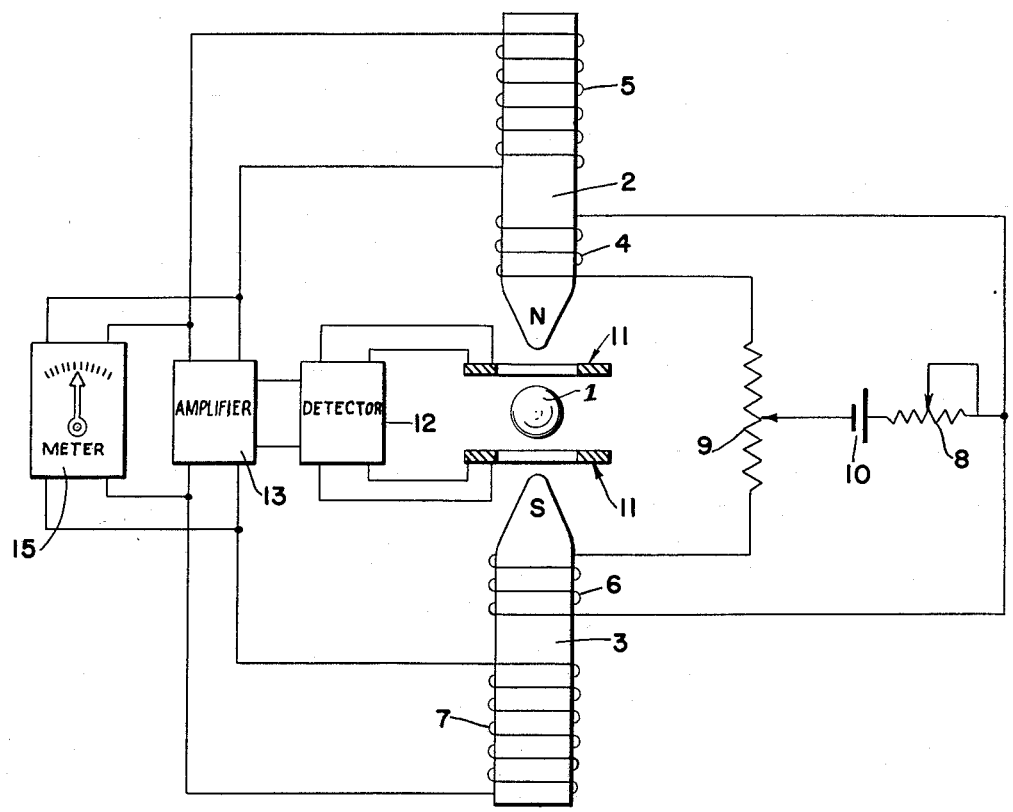
INVENTOR.
EDWARD N. DACUS
BY
ATTORNEY

United States Patent Office 3,090,239
Patented May 21, 1963

3,090,239
ACCELEROMETER
Edward N. Dacus, San Diego County, Calif., assignor to Bill Jack Scientific Instrument Co., Solana Beach, Calif., a corporation of California
Filed May 12, 1955, Ser. No. 507,768
5 Claims. (Cl. 73—517)

This invention relates to improvements in devices for measuring and indicating various forces, such as acceleration, gravity and other forces, acting upon a mass that is freely suspended in space between coaxially disposed electromagnets.

More specifically, my invention involves the use of a ferromagnetic mass that is suspended by a system of coaxially arranged electromagnets with devices for supplying and controlling the current exciting said electromagnets, which are capable, solely by magnetic forces of attraction, of positioning and maintaining the ferromagnetic mass suspended freely in space against external forces including gravity substantially coaxially between the magnets, without having mechanical attachment or contact of any kind, and which is thus freely free from friction. By virtue of being completely free from frictional restraint of any kind, the device of my invention may provide for an accelerometer of very great sensitivity and precision.

Among the objects of my invention, including the provision of a magnetic suspension of a mass in space and free from any physical connection or frictional contact with the suspension means, involving a system of coaxial electromagnets capable of suspending the mass in space against external forces including gravity between the poles of the electromagnets, a means for so adjusting the magnetic forces that, in the absence of an external axial force or acceleration the sum of the forces applied to the mass is zero when the suspended mass is at a midpoint between the coaxial electromagnets.

A further object is to provide a sensing device for detecting axial movement of the suspended mass in either ditrection from the midpoint between the coaxial magnets.

A further object is to provide a detector and amplifier controlled by the sensing device that will be capable of so altering the magnetic strength of the coaxial electromagnets as to maintain the suspended mass in space at the midpoint, or other selected point, between the poles of the coaxial electromagnets despite axial forces applied to the suspended mass.

A further object is to provide a differential electrical device for measuring and indicating any changes in the relative strengths of the coaxial electromagnets as a measure of axial forces that are acting upon the suspended mass.

With the foregoing and other objects in view, the invention resides in the combination of parts and in the details of construction hereinafter set forth in the following specification and appended claims, certain embodiments thereof being illustrated in the accompanying drawing which is a schematic illustration of a mass freely suspended in space between two coaxially disposed electromagnets, a source of electricity, a rheostat and a sensing device in circuit with a detector and amplifier and an indicating device.

Referring more particularly to the drawing, I have shown one form that my invention may take. This includes a mass of ferromagnetic material 1, shown in the form of a sphere suspended between two coaxially disposed electromagnets 2 and 3. The electromagnet 2 is excited by windings 4 and 5. The electromagnet 3 is excited by windings 6 and 7. The windings 4 and 6 are excited from a battery 10 or other source of continuous electric current. A variable rheostat 8 controls the current flowing through the windings 4 and 6, while the differential rheostat 9 controls the division of current between the windings 4 and 6. It will be understood that the arrangement of rheostats 8 and 9 shown in FIGURE 1 is simply illustrative and that any arrangement which provides individual control of the current in each of the windings 4 and 6 would be effective.

Currents to exite windings 5 and 7 on the electromagnets 2 and 3 are provided by the amplifier 13 in a manner to be described. It is a necessary condition for operation of my invention that the currents in windings 4 and 5, 6 and 7 be of such a value that the resultant of all forces due to gravity, to any external longitudinal forces, or to acceleration, acting on the ferromagnetic mass 1 along the common axis of the electromagnets 2 and 3, be zero when the ferromagnetic mass 1 is midway between the poles of electromagnets 2 and 3.

Adjacent to the ferromagetic mass 1, and fixed to the frame supporting the electromagnets 2 and 3, is a sensing device 11, to which is coupled a detector 12. The position of the ferromagnetic mass 1 between the poles of the electrtomagnets 2 and 3 provides electrical signals from the detector 12 which control the amplifier 13. The amplifier 13 provides current to excite the windings 5 and 7 of electromagnets 2 and 3 in such a manner that a slight axial displacement of the ferromagnetic mass 1 upwardly between the electromagnets from the center position between the electromagnets 2 and 3 will decrease the current in winding 5 and correspondingly increase the current in winding 7, and vice versa. Thus, the ferromagnetic mass is held midway between the poles of the electromagnets 2 and 3. By proper choice of the characteristics of the detector 12, the signals controlling amplifier 13 can be made of such a nature as to rapidly damp out any axial movement of the ferromagnetic mass 1. Thus, the ferromagnetic mass 1 is held suspended in space free of any physical connection or contact with the electromagnets, and thus free from friction. It can, if desirable, be enclosed by an air tight evacuated enclosure so as to be free from disturbing effects due to air currents and air friction. The functions of coils 4 and 6 can be combined with those of coils 5 and 7, by suitable arrangement of the electrical circuit, so that only coils 5 and 7 will be required in practice, if desired.

Any force, momentary or sustained, that is applied to the ferromagnetic mass 1 along the common axis of the electromagnets 2 and 3, whether it be due to tilt of that axis relative to the horizontal, to acceleration of the device as a whole along that axis, or to change of the acceleration of gravity when the axis is vertical, will be opposed by magnetic forces, due to changes of currents in the windings 5 and 7, and such changes may be visually observed on a suitable differential electric meter 15. Thus, this embodiment of my invention may be used as a level, an accelerometer, a gravimeter, and indeed a device for measuring any force along the axis of the device. The sensitivity of the device, and the span of its measurement, may be adjusted to a desired value by varying the ratio of the magnetic forces provided by the windings 4 and 6 to those provided by the windings 5 and 7.

Thus, from the foregoing it will be seen that I have provided a magnetic suspension for a ferromagnetic member in space, free from any mechanical connection or contact, and thus free from friction, the same including a system of coaxial electromagnets capable of suspending the ferromagnetic member between their poles. I have also provided means for so adjusting the magnetic forces that, in the absence of an external axial force or acceleration the sum of the forces applied to the ferromagnetic member is zero when said member is at the midpoint between the coaxial magnets. I have also provided a sensing device for detecting axial movement of the magnetically suspended member in either direction from the midpoint between the poles of the coaxial magnets. I have provided a detector and amplifier controlled by the sensing device, capable of so altering the magnetic strength of the coaxial electromagnets as to maintain the suspended ferromagnetic member at the midpoint between the poles of the coaxial electromagnets despite axial forces applied to it, due to any cause. In addition, I have provided a differential electric meter, or other device, to visually indicate the changes in the relative strengths of the coaxial electromagnets for the purpose of measuring and indicating the axial forces on the suspended member.

It will be seen that this invention comprises some of the elements of my co-pending application Serial Number 544,954, filed November 4, 1955, now Patent No. 2,856,240, by Breazeale et al. for Magnetic Suspension Control System, disclosing a device for suspending a rotatable object in space. It will be seen that the two devices may be combined very simply, in such a manner as to provide an instrument in which a member may be so suspended in space that it is free to rotate about its axis without friction, and at the same time is capable of measuring any forces of whatever nature acting along the axis of rotation of the device. The combination of these two separate inventions thus gives a device which combines the features of both inventions, and has many useful applications, for example, in an instrument which is capable of indicating a true vertical reference line and, at the same time, of measuring accelerations in an axial plane.

It is to be understood that I am primarily concerned with magnetic suspension of objects in space between coaxially disposed magnets, as distinguished from arrangements having magnets in overlapping relationship with the object, so that the axis of suspension of the object is maintained substantially coaxial with the suspension magnets.

Moreover, by means of my suspension system, I am able to so suspend the object in space, despite the existence of varying external forces that may be applied to the object, such as the shifting of the axis of suspension relative to the horizontal. In other words, my suspension is operable not only under static conditions, but is designed for use in systems that will be operable under dynamic conditions such as occur when used on moving platforms and on moving vehicles, such as aircraft and the like.

I claim:

1. In combination with a magnetic material mass and a pair of electromagnets coaxially disposed on opposite sides of said mass and in non-overlapping relationship with said mass, a source of electric power and a differential rheostat between said source and the input ends of windings around the opposed poles of said electromagnets for magnetically suspending said mass freely in space substantially axially between said poles, said electromagnets constituting the sole supporting means for said mass, a variable rheostat between said output ends of said windings and said power source, a device for measuring and indicating axial components of forces and accelerations imposed upon said mass between said electromagnets and including a sensing device, a detector and an amplifier coupled in tandem with said sensing device, a measuring and indicating device coupled with said amplifier and a second pair of windings coupled to the poles of said electromagnets and to said amplifier, the sensing and detecting means in conjunction with each other being adapted to generate electrical signals of predetermined magnitude, frequency and phase to control the amplifying means, which in turn, controls the electromagnets, the whole operating as a system to control, measure and indicate axial movements of said mass between the electromagnets.

2. In combination with a magnetic material mass and a pair of electromagnets coaxially disposed on opposite sides of said mass and in non-overlapping relationship with said mass, a source of electric power and a differential rheostat between said source and the input ends of windings around the opposed poles of said electromagnets for magnetically suspending said mass freely in space substantially axially between said poles, said electromagnets constituting the sole supporting means for said mass, a variable rheostat between said output ends of said windings and said power source, a device for measuring and indicating axial components of forces and accelerations imposed upon said mass between said electromagnets and including a sensing device disposed between said mass and each of said electromagnets, a detector and an amplifier coupled in tandem with said sensing device, a measuring and indicating device coupled with said amplifier and a second pair of windings coupled to the poles of said electromagnets and to said amplifier, the sensing and detecting means in conjunction with each other being adapted to generate electrical signals of predetermined magnitude, frequency and phase to control the amplifying means, which in turn, controls the electromagnets, the whole operating as a system to control, measure and indicate axial movements of said mass between said electromagnets.

3. An accelerometer comprising a magnetic material mass, a pair of spaced electromagnets coaxially disposed on opposite sides of said mass, each said electromagnet including a core and a first and second coil, a source of power, means to proportionately supply current from said power source to said first coil of said electromagnets to energize each said elemtromagnet to thereby suspend said mass freely in space in a neutral position between said electromagnets, said electromagnets constituting the sole supporting means for said mass, means to detect axial movements of said mass from its neutral position due to axial components of external forces acting on the mass, control means connected in circuit with each said second coil of each electromagnet, said control means being further connected to said detector means and being responsive to signals therefrom to oppositely vary the current supplied to each said second coil of each electromgnet to differentially vary the strength thereof to create an opposing magnetic force to counter said external axial force components to maintain said mass stable in its neutral position, and means connected to the control means for measuring and indicating the magnitude of the applied opposing magnetic force applied by said electromagnets.

4. A force measuring instrument comprising a magnetic material mass, a pair of electromagnets coaxially disposed on opposite sides of said mass, means to energize said electromagnets for magnetically suspending said mass freely in space in an axial neutral position between said electromagnets, said electromagnets constituting the sole supporting means for said magnetic material mass, electrical control means to differentially vary the forces exerted by the electromagnets on said magnetic material mass, sensing means to detect axial movements of the mass responsive to components of external forces acting on said magnetic material mass, said sensing means being interconnected with said electrical control means to initiate the differential action of said electromagnets to thereby create an opposing magnetic force on said mass to counter the externally applied force components to maintain said mass in the neutral position, and a measuring means interconnected with said electrical control means to indicate the magnitude of the opposing magnetic force applied by said electromagnets.

5. A force measuring instrument comprising a magnetic material mass, a pair of electromagnets coaxially disposed on opposite sides of said mass, said electromagnets each including first and second coil windings, means to energize the first coil of each electromagnet for creating magnetic forces to act on said magnetic material mass to suspend said mass freely in space in an axial neutral position between said electromagnets, said electromagnets constituting the sole supporting means for said magnetic material mass, electrical control means interconnected with said second coil winding on each electromagnet to differentially vary the forces exerted by the electromagnets on said magnetic material mass, sensing means to detect axial movements of the mass responsive to components of external forces acting on said magnetic material mass, said sensing means being interconnected with said electrical control means to initiate the differential action of said electromagnets to thereby create an opposing magnetic force on said mass to counter the externally applied force components to maintain said mass in the neutral position, and a measuring means interconnected with said electrical control means to indicate the magnitude of the opposing magnetic force applied by said electromagnets.

References Cited in the file of this patent

UNITED STATES PATENTS

| | | |
|---|---|---|
| 1,589,039 | Anschutz-Kaempfe | June 15, 1926 |
| 2,591,921 | Cosgriff et al. | Apr. 8, 1952 |
| 2,691,306 | Beams et al. | Oct. 12, 1954 |
| 2,695,165 | Hansen | Nov. 23, 1954 |

FOREIGN PATENTS

| | | |
|---|---|---|
| 23,991 | Great Britain | Nov. 7, 1904 |
| 539,409 | Great Britain | Sept. 9, 1941 |